(12) United States Patent
Mizuta et al.

(10) Patent No.: US 9,657,201 B2
(45) Date of Patent: May 23, 2017

(54) ADHESIVE COMPOSITION AND IMAGE DISPLAY DEVICE USING SAME

(71) Applicant: Mitsui Chemicals, Inc., Minato-ku (JP)

(72) Inventors: Yasushi Mizuta, Ichihara (JP); Toshikazu Gomi, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 457 days.

(21) Appl. No.: 14/344,382

(22) PCT Filed: Sep. 27, 2012

(86) PCT No.: PCT/JP2012/006180
§ 371 (c)(1),
(2) Date: Mar. 12, 2014

(87) PCT Pub. No.: WO2013/046686
PCT Pub. Date: Apr. 4, 2013

(65) Prior Publication Data
US 2014/0370316 A1    Dec. 18, 2014

(30) Foreign Application Priority Data

Sep. 29, 2011  (JP) ................................. 2011-214696

(51) Int. Cl.
| | | |
|---|---|---|
| *C09J 133/08* | (2006.01) | |
| *C09J 11/06* | (2006.01) | |
| *C09J 11/08* | (2006.01) | |
| *C09J 151/00* | (2006.01) | |
| *C09J 4/06* | (2006.01) | |
| *C08F 255/08* | (2006.01) | |
| *C08F 257/02* | (2006.01) | |
| *C08F 220/18* | (2006.01) | |
| *C08F 222/10* | (2006.01) | |
| *G02F 1/133* | (2006.01) | |
| *C09J 5/00* | (2006.01) | |
| *G02F 1/1333* | (2006.01) | |
| *C08K 5/00* | (2006.01) | |

(52) U.S. Cl.
CPC .......... *C09J 133/08* (2013.01); *C08F 255/08* (2013.01); *C08F 257/02* (2013.01); *C09J 4/06* (2013.01); *C09J 5/00* (2013.01); *C09J 11/06* (2013.01); *C09J 11/08* (2013.01); *C09J 151/003* (2013.01); *G02F 1/1333* (2013.01); *C08F 220/18* (2013.01); *C08F 222/1006* (2013.01); *C08K 5/0025* (2013.01); *C09J 2433/00* (2013.01); *G02F 2202/28* (2013.01); *Y10T 428/31935* (2015.04)

(58) Field of Classification Search
None
See application file for complete search history.

(56) References Cited

U.S. PATENT DOCUMENTS

| | | | |
|---|---|---|---|
| 2007/0141288 A1 | 6/2007 | Hongo et al. | |
| 2011/0073901 A1* | 3/2011 | Fujita | C09D 165/00 |
| | | | 257/100 |
| 2012/0263964 A1 | 10/2012 | Toyoda et al. | |

FOREIGN PATENT DOCUMENTS

| | | |
|---|---|---|
| EP | 2093268 A1 | 8/2009 |
| JP | 2000-169819 A | 6/2000 |
| JP | 2000-273428 A | 10/2000 |
| JP | 2003-277709 A | 10/2003 |
| JP | 2005-134841 A | 5/2005 |
| JP | 2007-077203 A | 3/2007 |
| JP | 2007-169327 A | 7/2007 |
| JP | 2010-072471 A | 4/2010 |
| JP | 2011-140594 A | 7/2011 |
| JP | 2012-126839 A | 7/2012 |
| WO | WO 2009/148716 A2 | 12/2009 |
| WO | WO 2009/148722 A2 | 12/2009 |
| WO | WO 2010/033419 A2 | 3/2010 |
| WO | WO 2011/046102 A1 | 4/2011 |

OTHER PUBLICATIONS

International Search Report (PCT/ISA/210) mailed on Jan. 8, 2013, by the Japanese Patent Office as the International Searching Authority for International Application No. PCT/JP2012/006180.

* cited by examiner

*Primary Examiner* — Sheeba Ahmed
(74) *Attorney, Agent, or Firm* — Buchanan, Ingersoll & Rooney PC (57) ABSTRACT

The present invention provides an adhesive composition which has a cured product exhibiting high transparency and a high refractive index, and which has high adhesive strength and experiences little reduction in the adhesive strength, even when exposed to high temperatures. In order to achieve the above the adhesive composition includes: (1) a hydrocarbon polymer having a total light transmittance of visible light, as measured according to JIS K7361-1, of at least 80%; (2) at least one kind of (meth)acrylic monomer selected from a mono(meth)acrylic monomer having one (meth)acrylic group in a molecule and a di(meth)acrylic monomer having two (meth)acrylic groups in a molecule; and (3) a photoinitiator; wherein 30-190 parts by weight of component (2) are included relative to 100 parts by weight of component (1).

12 Claims, 1 Drawing Sheet

FIG. 1 ptions of the claims and figures.

ADHESIVE COMPOSITION AND IMAGE DISPLAY DEVICE USING SAME

TECHNICAL FIELD

The present invention relates to an adhesive composition suitable as a component of an image display apparatus, and to an image display apparatus.

BACKGROUND ART

In recent years, in electronic and optical elements such as portable terminal devices such as cellular phones and PDA, digital cameras, digital video cameras, reduction in thickness and weight, and furthermore, production of paper-like display parts have been attempted in parallel with enhanced functionality. Tapes for supplying pressure sensitive adhesive layers have been used as materials for the attachment of components of these electronic and optical devices. However, the pressure sensitive adhesive layer of such a tape is insufficient in adhesive strength and, when exposed to high temperatures, suffers from, for example, significantly reduced adhesive strength.

A liquid crystal panel and other components are disposed in the image display part of an image display apparatus. The liquid crystal panel includes, for example, a liquid crystal cell and polarizing plates laminated to both sides of the liquid crystal cell, and is very weak to impacts from the outside. For this reason, in conventional image display apparatuses, a transparent protective member is arranged at the front of the liquid crystal panel with a certain gap in between. The gap has a role of buffering the impact from the outside for protecting the display panel. However, since the refractive index of the protective member greatly differs from the refractive index of a gap (air space), Fresnel reflection occurs in the interface between the protective member and the gap. This disadvantageously causes a reduction in the visibility of the image displayed on the liquid crystal panel.

To counter the foregoing problem, it has been contemplated in the art to dispose a transparent adhesive film between the liquid crystal panel and the protective member to improve the visibility of an image (e.g., PTL 1). However, if there are irregularities on the surface of one or both of the liquid crystal panel and protective member, the adhesive film cannot sufficiently follow the irregularities easily generating gaps in the vicinity thereof. The gaps disadvantageously cause a further reduction in the visibility. This problem easily occurs particularly in a touch panel-type image display apparatus in which electrodes are formed on the protective member.

It has also been contemplated in the art to dispose an acrylic resin layer having high transparency between the liquid crystal panel and the protective member (PTL 2). However, since the refractive index of a transparent resin essentially including a conventional acrylic resin is lower than the refractive index of the protective member, the visibility of the image display apparatus is not yet sufficient. Further, in order to increase the refractive index of the transparent resin layer with which the space between the image panel and the protective member is filled, the addition of a terpene resin having a high refractive index to the acrylic resin has also been studied. However, disadvantageously, a photo-cured product of these resins is cloudy or has reduced adhesive strength between the image panel and the protective member.

Polyisopropyltoluene is known as a tackifier, and the addition of about 10 parts by weight thereof to 100 parts by weight of a polymer for adhesion is common (PTLs 3 to 6).

| Citation List Patent Literature |
|---|
| PTL 1 |
| Japanese Patent Application Laid-Open No. 2007-169327 |
| PTL 2 |
| Japanese Patent Application Laid-Open No. 2005-134841 |
| PTL 3 |
| Japanese Patent Application Laid-Open No. 2011-140594 |
| PTL 4 |
| Japanese Patent Application Laid-Open No. 2000-169819 |
| PTL 5 |
| Japanese Patent Application Laid-Open No. 2000-273428 |
| PTL 6 |
| Japanese Patent Application Laid-Open No. 2003-277709 |

SUMMARY OF INVENTION

Technical Problem

The present invention has been made in view of the foregoing problems pertinent in the art. Specifically, an object of the present invention is to provide an adhesive composition which affords a cured product having high transparency, high refractive index, high adhesive strength, and less reduction in adhesive strength even when exposed to high temperatures.

Solution to Problem

As a result of intensive studies to solve the above-described problems, the present inventors have found that when a hydrocarbon polymer and an acrylic monomer are mixed in a specific ratio, the resulting adhesive composition gives a cured product having high transparency and a high refractive index, has high adhesive strength, and shows less reduction in adhesive strength even when exposed to high temperatures. The present invention has been completed on the basis of these findings.

Specifically, the present invention provides the following adhesive compositions, image display apparatuses, and method for producing an image display apparatus.

[1] An adhesive composition including: (1) a hydrocarbon polymer having a total light transmittance in a visible light region at a thickness of 1 mm as measured according to JIS K7361-1 of 80% or more; (2) one or more (meth)acrylic monomers selected from a monofunctional (meth)acrylic monomer having one (meth)acrylic group in a molecule and a (meth)acrylic monomer having two (meth)acrylic groups in a molecule; and (3) a photoinitiator, wherein the content of the component (2) is 30 parts by weight or more and less than 190 parts by weight relative to 100 parts by weight of the component (1).

[2] The adhesive composition according to [1], wherein, in an image display apparatus having a protective member and a base having an image display part, the adhesive composition is arranged between the protective member and the base.

[3] The adhesive composition according to [1] or [2], wherein the component (1) has a softening point of 70 to 130° C.

[4] The adhesive composition according to any one of [1] to [3], wherein a storage modulus E' (25) of a cured product of the adhesive composition as measured at 25° C. and 10 Hz is more than $1.0\times10^7$ Pa and $1.0\times10^9$ Pa or less.

[5] The adhesive composition according to any one of [1] to [4], wherein the component (1) is one or more polymers selected from the group consisting of polyisopropyltoluene, an alicyclic saturated hydrocarbon resin, and a terpene hydride.

[6] The adhesive composition according to [5], wherein the component (1) is polyisopropyltoluene having a number-average molecular weight (Mn) of 400 to 1,200 and a molecular weight distribution (Mw/Mn) represented by a ratio of weight-average molecular weight (Mw) to number-average molecular weight (Mn) of 2 or less.

[7] The adhesive composition according to [6], wherein the component (1) is polyisopropyltoluene prepared by polymerizing isopropenyl toluene with a Friedel-Crafts catalyst.

[8] The adhesive composition according to any one of [1] to [7], wherein the monofunctional (meth)acrylic monomer is represented by the following general formula (1):

(1)

wherein $R_1$ represents a $C_{4-18}$ hydrocarbon group, and $R_2$ represents a hydrogen atom or a methyl group.

[9] The adhesive composition according to any one of [1] to [7], wherein the bifunctional (meth)acrylic monomer is represented by the following general formula (2):

(2)

where $R_3$ represents a $C_{4-12}$ hydrocarbon group, and $R_4$ and $R_5$ independently represent a hydrogen atom or a methyl group.

[10] The adhesive composition according to any one of [1] to [9], further including: (4) a copolymer of a $C_{4-6}$ unsaturated aliphatic hydrocarbon having one or two carbon-carbon double bonds in a molecule and isopropenyl toluene, the copolymer having a number-average molecular weight (Mn) of 400 to 1,200 and a molecular weight distribution (Mw/Mn) represented by a ratio of weight-average molecular weight (Mw) to number-average molecular weight (Mn) of 2 or less.

[11] The adhesive composition according to any one of [1] to [10], wherein the adhesive composition has a viscosity at 25° C. and 10 rpm as measured by an R-type viscometer of 0.5 to 10 Pa·s.

[12] An image display apparatus including: a protective member; a base having an image display part; and a filler interposed between the protective member and the base, wherein the filler is a cured product of the adhesive composition according to any one of [1] to [11].

[13] An image display apparatus, including: a protective member; a base having an image display part; and a filler interposed between the protective member and the base, wherein the filler has a total light transmittance in a visible light region of 90% or more and a storage modulus E' (25) as measured at 25° C. and 10 Hz of more than $1.0\times10^7$ Pa and $1.0\times10^9$ Pa or less.

[14] A method for producing an image display apparatus including a protective member, a base having an image display part, and a filler interposed between the protective member and the base, the method including the steps of: interposing the adhesive composition according to any one of [1] to [11] between the protective member and the base; and curing the adhesive composition by light irradiation.

Advantageous Effects of Invention

The adhesive composition of the present invention affords a cured product having high transparency and a high refractive index. Therefore, the adhesive composition is particularly useful as an adhesive layer or filler for image display apparatuses and can provide an excellent image display apparatus.

DESCRIPTION OF EMBODIMENTS

1. Adhesive Composition

The adhesive composition of the present invention contains: (1) a hydrocarbon polymer, (2) a (meth)acrylic monomer, and (3) a photoinitiator; and optionally (4) a copolymer of an unsaturated aliphatic hydrocarbon and isopropenyl toluene, and (5) other components.

(1) Hydrocarbon Polymer

The hydrocarbon polymer contained in the adhesive composition is a polymer consisting of carbon and hydrogen, and preferably has a total light transmittance in the visible light region, as measured according to JIS K7361-1, of 80% or more, more preferably 85% or more, further preferably 90% or more. The total light transmittance is obtained by preparing a molded plate of the hydrocarbon polymer having a thickness of 1 mm and measuring the light transmittance of the molded plate with a haze meter or the like. Examples of the haze meter include a haze meter NDH4000 manufactured by Nippon Denshoku Industries Co., Ltd. Note that the visible light as used in the present invention refers to the light having a wavelength of 400 to 700 nm.

The hydrocarbon polymer preferably has a softening point of 70 to 130° C., more preferably 80 to 120° C., further preferably 85 to 110° C. When the softening point of the hydrocarbon polymer is within any of the above-described ranges, the adhesive strength of the adhesive composition is significantly enhanced. Further, the storage modulus E' (25) at 25° C. of the cured product of the composition of the present invention is enhanced to reduce the amount of moisture permeation. Furthermore, when the softening point is within any of the above-described ranges, the cure shrinkage during curing of the adhesive composition is suppressed.

The softening point is measured by the ring and ball method according to JIS K2207. Examples of the measuring apparatus include ASP-MG manufactured by MEITECH Company, Ltd.

The type of the hydrocarbon polymer is not particularly limited, but is preferably an alicyclic saturated hydrocarbon resin, a terpene hydride, or polyisopropyltoluene from the point of view of transparency and adhesiveness.

The alicyclic saturated hydrocarbon resin may include a resin prepared by hydrogenating a xylene resin or a petroleum resin. The number-average molecular weight (Mn) of the alicyclic saturated hydrocarbon resin is preferably 400 to 1,200, more preferably 600 to 1,000.

The terpene hydride is a resin prepared by hydrogenating an aromatic modified terpene resin. The number-average molecular weight (Mn) of the terpene hydride is preferably 600 to 2,000, more preferably 800 to 1,500.

The polyisopropyltoluene preferably has a number-average molecular weight (Mn) of 400 to 1,200, more preferably 450 to 1,000, further preferably 500 to 800. The polyisopropyltoluene preferably has a molecular weight distribution (Mw/Mn) represented by the ratio of weight-average molecular weight (Mw) to number-average molecular weight of 2 or less, more preferably 1.3 to 2.0, further preferably 1.5 to 2.0. When the number-average molecular weight (Mn) and molecular weight distribution (Mw/Mn) are within any of the above-described ranges, the viscosity of the adhesive composition is easily within a desired range to facilitate the application of the adhesive composition. The number-average molecular weight (Mn) and molecular weight distribution (Mw/Mn) can be measured by gel permeation chromatography (GPC) using polystyrene as the standard.

The polyisopropyltoluene may include any of a structural unit derived from meta-isopropenyl toluene, a structural unit derived from para-isopropenyl toluene, and a structural unit derived from ortho-isopropenyl toluene. The polyisopropyltoluene is usually a copolymer thereof. However, as compared with the polyisopropyltoluene consisting of para- or ortho-isopropenyl toluene, the polyisopropyltoluene derived from meta-isopropenyl toluene has low crystallinity and shows high adhesive properties. For this reason, the number of moles of the structural unit derived from meta-isopropenyl toluene is preferably 50% or more of the total number of moles of all the structural units constituting the polyisopropyltoluene.

The method for producing the polyisopropyltoluene is preferably, but not particularly limited to, the polymerization of isopropenyl toluene in the presence of a Friedel-Crafts catalyst. This is because when a Friedel-Crafts catalyst is used, the number-average molecular weight and molecular weight distribution of polyisopropyltoluene can be easily adjusted within a desired range.

Further, as described above, the isopropenyl toluene as a raw material is preferably meta-isopropenyl toluene or an isomeric mixture of isopropenyl toluene containing 50% by weight or more of meta-isopropenyl toluene.

The Friedel-Crafts catalyst may be a known one. Examples thereof include various complexes of aluminum chloride, aluminum bromide, dichloromonoethylaluminum, titanium tetrachloride, tin tetrachloride, and boron trifluoride. The Friedel-Crafts catalyst may be blended singly or in combination.

The amount of the Friedel-Crafts catalyst blended in the polymerization system is preferably 0.01 to 5.0 parts by weight relative to 100 parts by weight of isopropenyl toluene.

The polymerization reaction using the Friedel-Crafts catalyst is preferably carried out in a solvent, and the polymerization reaction is preferably carried out in an aromatic solvent or in a mixture of an aromatic solvent and a hydrocarbon solvent and/or an alicyclic hydrocarbon solvent. Examples of the aromatic solvent include toluene, xylene, ethylbenzene, mesitylene, and cumene. Examples of the aliphatic hydrocarbon solvent include pentane, hexane, and heptane. Examples of the alicyclic hydrocarbon solvent include cyclopentane, cyclohexane, and methylcyclohexane. The amount of the solvent used is preferably such an amount that the concentration of isopropenyl toluene as a raw material is 10 to 50% by weight.

The temperature during polymerization is suitably selected depending on the type of a catalyst and the amount thereof, the type of a solvent, and the like, but is preferably in the range of −30 to 50° C.

The content of the hydrocarbon polymer is preferably 20 to 90 parts by weight, more preferably 30 to 80 parts by weight, relative to 100 parts by weight of the adhesive composition. When the amount of the hydrocarbon polymer is within any of the above-described ranges, the cured product of the composition is excellent in the balance of transparency, a refractive index, adhesive properties, and the like.

(2) (Meth)acrylic Monomer

The adhesive composition contains one or more (meth) acrylic monomers selected from a monofunctional (meth) acrylic monomer having one (meth)acrylic group in a molecule and a bifunctional (meth)acrylic monomer having two (meth)acrylic groups in a molecule. The term "(meth) acrylic" represents "acrylic or methacrylic".

Examples of the monofunctional (meth)acrylic monomer having one acrylic group in a molecule include a monomer represented by the following general formula (1):

(1)

In general formula (1), $R_1$ represents a $C_{4-18}$ hydrocarbon group. The $C_{4-18}$ hydrocarbon group may be any of a linear alkyl group, a branched alkyl group, or an alkyl group containing a $C_{4-18}$ cycloalkane. In general formula (1), $R_2$ represents a hydrogen atom or a methyl group.

Specific examples of the monofunctional (meth)acrylic monomer represented by the above general formula (1) include n-butyl(meth)acrylate, i-butyl(meth)acrylate, 2-ethylhexyl(meth)acrylate, lauryl(meth)acrylate, i-stearyl(meth) acrylate, isoamyl(meth)acrylate, isodecyl(meth)acrylate, isooctyl(meth)acrylate, isomyristyl(meth)acrylate, tridecyl (meth)acrylate, and cyclohexyl(meth)acrylate. The adhesive composition may contain only one of the monofunctional (meth)acrylic monomers or may contain two or more thereof.

The bifunctional (meth)acrylic monomer having two (meth)acrylic groups in a molecule may be a monomer represented by the following general formula (2):

(2)

In general formula (2), $R_3$ represents a $C_{4-12}$ hydrocarbon group. The $C_{4-12}$ hydrocarbon group may be any of a linear alkylene group, a branched alkylene group, or an alkylene group containing a $C_{4-12}$ cycloalkylene group. Further, $R_4$ and $R_5$ in general formula (2) independently represent a hydrogen atom or a methyl group.

In general formula (2), $R_3$ represents a $C_{4-12}$ hydrocarbon group. The $C_{4-12}$ hydrocarbon group may be any of a linear alkylene group, a branched alkylene group, or an alkylene group containing a $C_{4-12}$ cycloalkylene group. Further, $R_4$ and $R_5$ in general formula (2) independently represent a hydrogen atom or a methyl group.

Specific examples of the bifunctional (meth)acrylic monomer represented by the above general formula (2) include 1,3-butylene glycol di(meth)acrylate, 1,4-butylene glycol di(meth)acrylate, 1,6-hexanediol di(meth)acrylate, neopentyl glycol di(meth)acrylate, and 1,9-nonanediol di(meth)acrylate. The adhesive composition may contain only one of the bifunctional (meth)acrylic monomers or may contain two or more thereof.

When the adhesive composition contains the monofunctional (meth)acrylic monomer and the bifunctional (meth) acrylic monomer, the content ratio thereof is arbitrary; when the content ratio of the bifunctional (meth)acrylic monomer increases, the adhesion reliability under a high-humidity/ high-temperature environment increases.

The total amount of the (meth)acrylic monomer contained in the adhesive composition is 30 parts by weight or more and less than 190 parts by weight, preferably 30 parts by weight or more and less than 90 parts by weight, further preferably 40 to 80 parts by weight, relative to 100 parts by weight of the hydrocarbon polymer. If the above content of the (meth)acrylic monomer is less than 30 parts by weight, the adhesive composition is less likely to be sufficiently cured, and the adhesive strength is liable to be reduced under high temperature conditions. On the other hand, if the above content of the (meth)acrylic monomer is 190 parts by weight or more, the adhesive strength improvement effect of the hydrocarbon polymer is not sufficiently obtained, and the adhesive strength of the cured product of the adhesive composition is liable to be reduced also in this case. Further, if the (meth)acrylic monomer is excessive, the cure shrinkage of the adhesive composition is so large that when the adhesive composition is used for an image display apparatus, distortion of the protective member and/or base is liable to occur. Furthermore, the storage modulus of the adhesive composition is reduced, and the amount of moisture permeation is liable to increase.

(3) Photoinitiator

The adhesive composition contains a photoinitiator. The type of the photoinitiator is not particularly limited, and may be a known photoinitiator. Examples of the photoinitiator include an alkylphenone compound, an acylphosphine oxide compound, a titanocene compound, an oxime ester compound, a benzoin compound, an acetophenone compound, a benzophenone compound, a thioxanthone compound, an α-acyloxim ester compound, a phenylglyoxylate compound, a benzil compound, an azo compound, a biphenylsulfide compound, an organic dye compound, an iron-phthalocyanine compound, a benzoin ether compound, and an anthraquinone compound. The adhesive composition may contain only one of the photoinitiators or may contain two or more thereof.

The photoinitiator is particularly preferably an alkylphenone compound and an acylphosphine oxide compound from the point of view of reactivity and the like.

The content of the photoinitiator is preferably 0.5 to 20 parts by weight, more preferably 4 to 16 parts by weight, further preferably 6 to 12 parts by weight, relative to 100 parts by weight of the (meth)acrylic monomer described above.

(4) Copolymer of Unsaturated Aliphatic Hydrocarbon and Isopropenyl Toluene

The adhesive composition may contain a copolymer of a $C_{4-6}$ unsaturated aliphatic hydrocarbon having one or two carbon-carbon double bonds in a molecule and isopropenyl toluene.

Examples of the $C_{4-6}$ unsaturated aliphatic hydrocarbon having one or two carbon-carbon double bonds in a molecule include 1-pentene, 2-pentene, 2-methyl-1-butene, 3-methyl-1-butene, 2-methyl-2-butene, 1,3-butadiene, 1,2-pentadiene, 1,3-dipentadiene, and 3-methyl-1,2-butadiene. The adhesive composition may contain only one of the hydrocarbons or may contain two or more thereof.

When the adhesive composition contains the copolymer, the refractive index of a cured product of the adhesive composition is adjusted. For example, when the refractive index of a cured product of the adhesive composition is much higher than the refractive index of the protective member of an image display apparatus, it is preferred that the copolymer be contained. Thereby, only the refractive index of the adhesive composition is reduced without greatly reducing the transparency and adhesive strength thereof.

The ratio of the number of moles of the component derived from isopropenyl toluene to the total number of moles of all the components of the above copolymer is preferably 60% to 99%, more preferably 70 to 97%, further preferably 80 to 95%. If the ratio of the component derived from isopropenyl toluene in the above copolymer is too small, the transparency, adhesive strength, and the like of a cured product of the adhesive composition tend to be reduced. On the other hand, if the ratio of the component derived from isopropenyl toluene is too large, the refractive index adjustment effect by the addition of the copolymer is hardly exhibited.

The above copolymer preferably has a number-average molecular weight (Mn) of 400 to 1,200, and preferably has a molecular weight distribution (Mw/Mn) represented by the ratio of weight-average molecular weight (Mw) to number-average molecular weight of 2 or less. The number-average molecular weight (Mn) of the copolymer is more preferably 450 to 1,000, further preferably 500 to 800. Further, the molecular weight distribution (Mw/Mn) of the copolymer is more preferably 1.3 to 2.0, further preferably 1.5 to 2.0. When the number-average molecular weight (Mn) and molecular weight distribution (Mw/Mn) are within any of the above-described ranges, the viscosity of the adhesive composition is liable to be in a desired range. The number-average molecular weight (Mn) and molecular weight distribution (Mw/Mn) can be measured by GPC using polystyrene as the standard.

The content of the copolymer is preferably 50 parts by weight or less, more preferably 1 to 10 parts by weight relative to 100 parts by weight of the adhesive composition. If the amount of the copolymer is excessive, various physical properties such as adhesive strength of the adhesive composition may be affected.

The copolymer is obtained by copolymerizing a $C_{4-6}$ unsaturated aliphatic hydrocarbon having one or two carbon-carbon double bonds in a molecule and isopropenyl toluene. The method for copolymerizing the unsaturated aliphatic hydrocarbon and isopropenyl toluene may be the same as the production method of polyisopropyltoluene described above. For example, it may be polymerization in the presence of a Friedel-Crafts catalyst, and the like. Further, isopropenyl toluene is the same raw material used for the production of the polyisopropyltoluene described above.

(5) Other Components

The adhesive composition may contain other components such as thermal radical generators, radical chain transfer agents, other resins, heat curing accelerators, fillers, modifiers, stabilizers, and/or antioxidants in amounts that do not compromise the effect of the present invention.

When the adhesive composition contains a thermal radical generator, the adhesive composition in regions that cannot be directly irradiated with light for curing can also be cured. The thermal radical generator may be any of the organic peroxides known in the art. Examples of the thermal radical generator include 2,4-dichlorobenzoyl peroxide, t-butylperoxy pivalate, 3,5,5-trimethylhexanoyl peroxide, octanoyl peroxide, decanoyl peroxide, lauroyl peroxide, succinic acid peroxide, acetyl peroxide, t-butyl peroxy(2-ethylhexanoate), m-toluoyl peroxide, benzoyl peroxide, t-butyl peroxymaleic acid, t-butyl peroxylaurate, t-butylperoxy-3,5,5-trimethylhexanoate, cyclohexanon peroxide, t-butylperoxyisopropylcarbonate, 2,5-dimethyl-2,5-di(benzoylperoxy)hexane, 2,2-bis(t-butylperoxy)octane, t-butyl peroxyacetate, 2,2-bis(t-butylperoxy)butane, t-butyl peroxybenzoate, n-butyl-4,4-bis(t-butylperoxy)valerate, di-t-butyl-diperoxyisophthalate, dicumyl peroxide, and methyl ethyl ketone peroxide. The adhesive composition may contain only one of the thermal radical generators or may contain two or more thereof.

The content of the thermal radical generator is preferably 0.1 to 5 parts by weight, more preferably 0.5 to 2.0 parts by weight relative to 100 parts by weight of the (meth)acrylic monomer.

When the adhesive composition contains the radical chain transfer agent, the curability of the adhesive composition is improved. Examples of the radical chain transfer agent include disulfides such as α-methylstyrene dimers, mercapto group-containing thiols, and diphenyldisulfide, terminal unsaturated methacrylate n-mers, and porphyrin cobalt complexes. The adhesive composition may contain only one of the radical chain transfer agents or may contain two or more thereof.

The content of the radical chain transfer agent is preferably 0.1 to 10 parts by weight, more preferably 0.5 to 5 parts by weight relative to 100 parts by weight of the (meth) acrylic monomer.

The adhesive composition may contain other resin(s) in amounts that do not greatly compromise the effect of the present invention. Other resins may be, for example, a thermosetting resin or the like. Examples of the thermosetting resin include an epoxy resin, a phenolic resin, a diallyl phthalate resin, a urea resin, and a polyester resin. The adhesive composition may contain only one of the thermosetting resins or may contain two or more thereof. The adhesive composition may contain a known curing agent, curing accelerator, and the like in combination with the above thermosetting resin.

Examples of the filler contained in the adhesive composition include glass beads, styrenic polymer particles, methacrylate polymer particles, ethylene polymer particles, and propylene polymer particles. The adhesive composition may contain only one of the fillers or may contain two or more thereof.

Examples of the modifier to be added in the adhesive composition include polymerization initiation promoters, anti-decomposing agents, leveling agents, wettability improvers, surfactants, plasticizers, ultraviolet absorbers, and antioxidants. The adhesive composition may contain only one of the modifiers or may contain two or more thereof.

(6) Method for Producing Adhesive Composition

The adhesive composition described above is obtained by mixing, simultaneously or in any order, (1) a hydrocarbon polymer, (2) a (meth)acrylic monomer, (3) a photoinitiator, (4) a copolymer of an unsaturated aliphatic hydrocarbon and isopropenyl toluene, and (5) other components. The mixing can be carried out by means of a known kneading machine such as a double-arm stirrer, a roll kneading machine, a twin-screw extruder, a ball mill kneader, or a planet stirrer.

(7) Physical Properties of Adhesive Composition

The adhesive composition preferably has a viscosity measured by an R-type viscometer at 25° C. and 10 rpm of 0.5 to 10 Pa·s, more preferably 0.5 to 7 Pa·s, further preferably 1 to 5 Pa·s. When the viscosity of the adhesive composition is within any of the above-described ranges, the coating properties of the adhesive composition will be satisfactory. Further, when the adhesive composition has such a viscosity, it can also be applied, for example, to an uneven substrate without leaving gaps.

On the other hand, the viscosity of a cured product of the adhesive composition is suitably selected depending on the application of the adhesive composition. For example, when the cured product of the adhesive composition is used as a filler (sealing material) of an image display apparatus, repair work may be required after curing of the adhesive composition. The repair work refers to the work of restoring a defect which may occur in the display pixels of a display panel or the like. In order to do the repair work, it is preferred that the cured product of the adhesive composition can be easily removed from an adherend. Therefore, the viscosity of the cured product of the adhesive composition is preferably 300 to 2,000 Pa·s in the application for which repair work is required. The viscosity of the cured product is measured by an R-type viscometer at 25° C. and 10 rpm.

On the other hand, in the application for which repair work or the like is not required, the viscosity of the cured product of the adhesive composition is preferably 2,000 to 40,000 Pa·s, further preferably 8,000 to 36,000 Pa·s.

The total light transmittance in the visible light region of the cured product of the adhesive composition is preferably 90% or more, more preferably 95% or more, further preferably 97% or more, particularly preferably 98% or more. It is possible to use the adhesive composition, for example, as an adhesive layer, a filler, or the like on the image extraction side of an image display apparatus because the cured product of the adhesive composition has the total light transmittance as described above. The total light transmittance may be measured based on ISO 13468.

Further, when the adhesive composition of the present invention is used for a filler between a display panel and a protective member of an optical element, the refractive index of the cured product of the adhesive composition is preferably close to the refractive index of the protective member. Since the refractive index of the cured product of the adhesive composition is close to the refractive index of the protective member, the reflection at the interface between the cured product of the adhesive composition and the protective member is reduced to increase the visibility of the optical element. The refractive index can be measured according to ISO 489 D line.

The storage modulus E' (25) as measured at 25° C. and 10 Hz of the cured product of the adhesive composition is preferably more than $1.0 \times 10^7$ Pa and $1.0 \times 10^9$ Pa or less, more preferably $1.1 \times 10^7$ to $9.0 \times 10^8$ Pa, further preferably $1.3 \times 10^7$ to $5.0 \times 10^8$ Pa. When the storage modulus E' (25) of the cured product of the adhesive composition is more than $1.0 \times 10^7$ Pa, the amount of moisture permeation of the cured product is reduced. When the storage modulus E' (25) of the cured product is $1.0 \times 10^9$ Pa or less, the cure shrinkage of the adhesive composition is suppressed. Thus, when the adhesive composition is used as an adhesive layer or a filler of an image display apparatus, a warp is difficult to occur in each member of the image display apparatus. Note that, in a common adhesive composition made of an acrylic resin or the like, if the storage modulus E' (25) of the cured product is increased to more than $1.0 \times 10^7$ Pa while maintaining high adhesive strength, a warp is liable to occur in each member by cure shrinkage. On the other hand, since the adhesive composition contains a predetermined amount of (1) the hydrocarbon polymer described above in the present invention, the cure shrinkage is suppressed even if the storage modulus of the cured product is increased to some extent. The storage modulus E' (25) refers to a storage modulus at 25° C. when a cured product of an adhesive composition is measured using a dynamic viscoelasticity meter (trade name "DMS6100" manufactured by SII Nanotechnology Inc.) at a measurement frequency of 10 Hz while increasing the temperature from 20° C. to 140° C. at a rate of 10° C./min.

The amount of moisture permeation of the adhesive composition is preferably 300 g/m$^2$·100 μm·day or less, more preferably 200 g/m$^2$·100 μm·day or less, further preferably 150 g/m$^2$·100 μm·day or less. When the amount of moisture permeation is 300 g/m$^2$·100 μm·day or less, water does not easily enter the image display apparatus side when the adhesive composition is used as a filler (sealing material) of various image display apparatuses. The amount of moisture permeation is a value as measured by a moisture permeation cup method according to JIS Z 0208 under a condition of 60° C. and 80%.

(8) Application

As described above, the cured product of the adhesive composition of the present invention has high transparency and a high refractive index. It is also excellent in adhesive strength and shows less reduction in adhesive strength even when exposed to high temperatures. Therefore, it can be utilized as an adhesive composition for attaching components of portable terminal devices such as cellular phones and PDAs and thin-film display parts, for laminating substrates of optical discs, and for attaching polarizing plates. It can also be utilized as an adhesive composition for fixing a member of various image display apparatuses such as a flat panel display.

In particular, the adhesive composition described above is preferably used as a filler between an image panel and a protective member of an image display apparatus, particularly a filler between a touch panel and a liquid crystal display panel of a touch panel-type display apparatus. When the adhesive composition is used as a filler between a liquid crystal display panel and a touch panel in the touch panel-type display apparatus, the displayed image is not blurred. The strength of the touch panel is also increased. Further, when the image panel is electronic paper based on electrophoresis or the like, the responsiveness is reduced due to water or the like. Therefore, it is necessary to seal it with a filler having a low amount of moisture permeation. The adhesive composition of the present invention is suitable also as a sealing material for electronic paper.

2. Image Display Apparatus

The image display apparatus of the present invention includes a protective member, a base having an image display part, and a filler (sealing material) arranged between the protective member and the base. In the image display apparatus of the present invention, the filler (sealing material) is composed of the cured product of the adhesive composition described above. The cured product of the adhesive composition described above has high transparency, a high refractive index, and high adhesive strength, and shows less reduction in adhesive strength even when exposed to high temperatures. Therefore, the image display apparatus having the filler composed of the cured product of the adhesive composition in a region visually recognized from the outside of the image display apparatus has good visibility of the image from the image display part and high durability. Note that in the "image display apparatus having the filler composed of the cured product of the adhesive composition in a region visually recognized from the outside of the image display apparatus", a transparent protective member is generally used.

The cured product of the adhesive composition described above may be arranged not only in a region visually recognized from the outside of the image display apparatus but also in a region which is not visually recognized from the outside. For example, a frame-shaped sealing material for laminating a protective member and a base may be the cured product of the adhesive composition described above. The cured product of the adhesive composition described above has high adhesive strength and shows less reduction in adhesive strength even when exposed to high temperatures. For this reason, when the cured product of the adhesive composition described above is used as a sealing material of the image display apparatus, the durability of the image display apparatus is improved.

Figure 1:
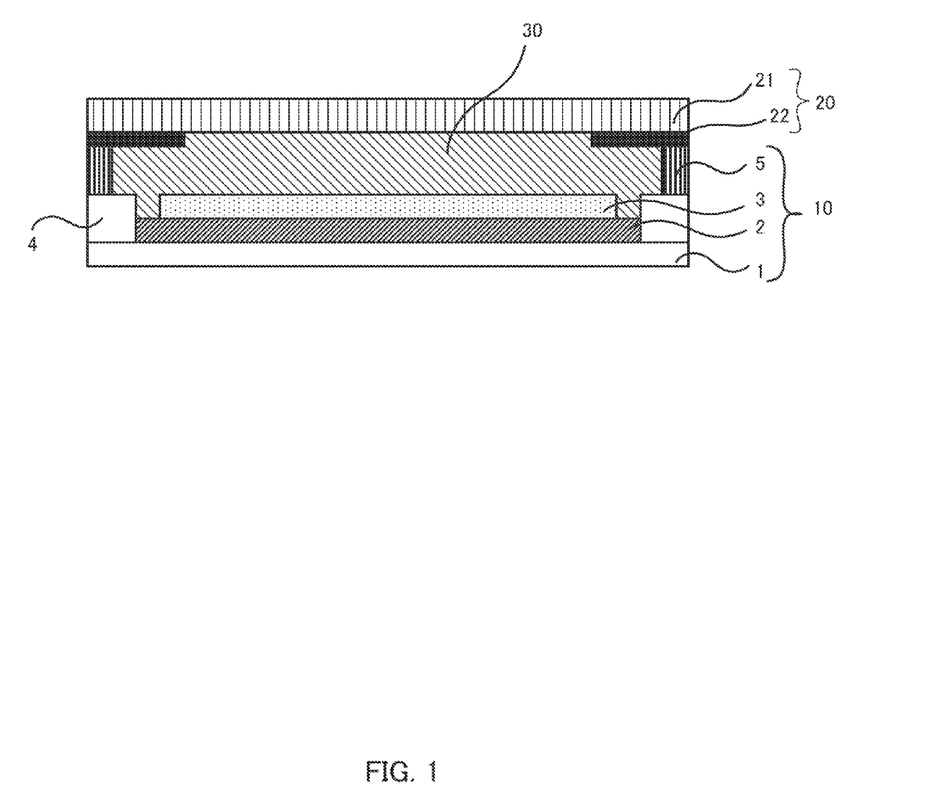
FIG. 1 is a schematic sectional view showing an example of the structure of the image display apparatus of the present invention.

Hereinafter, the structure of the image display apparatus will be described with reference to FIG. 1, but the image display apparatus of the present invention is not limited to this structure. Base 10 of the image display apparatus of the present invention has substrate 1, backlight 2 arranged on substrate 1, and liquid crystal display panel (image display part) 3 disposed on backlight 2. Further, the image display apparatus has frame 4 surrounding the outer periphery of liquid crystal display panel 3, and a plurality of spacers 5 are formed along the rim of frame 4. Spacers 5 serve to keep the spacing between base 10 and protective member 20 and are generally about 0.05 to 1.5 mm in height.

Transparent protective member 20 may include a structure in which transparent member 21 having a size comparable to base 10, and shade part 22 shading a region other than the display part are laminated. Transparent member 21 is composed of, for example, an optical glass plate, a resin plate (e.g., acrylic resin or polycarbonate resin), or the like. Note that when the image display apparatus is a touch panel-type display apparatus, protective member 20 is a touch panel substrate having an electrode and the like.

Shade part 22 may be prepared, for example, by applying a known composition for a shade part on a transparent member by a printing method.

The space between base 10 and protective member 20 is filled with filler 30. The thickness of the filler is the same as that of the spacing between base 10 and protective member 20, and is generally about 0.05 to 1.5 mm. As used herein, the phrase "filled with filler 30" encompasses not only the case where only filler 30 is sandwiched between base 10 and protective member 20, but also the case where filler 30 and other members are sandwiched therebetween. For example, a circuit member or the like may be arranged in the gap between base 10 and filler 30.

The image display apparatus is obtained by previously preparing base 10 and protective member 20 and laminating them with the adhesive composition described above. That is, the image display apparatus is obtained by interposing the adhesive composition described above between base 10 and protective member 20 and curing the same. Note that as shown in FIG. 1, filler 30 may be present not only between protective member 20 and bases 10, but also between panel 3 and frame 4, that is, around the image display part. For example, when panel 3 is electronic paper based on electrophoresis or the like, the space around the edge of panel 3 may be filled with filler 30 (the cured product of the adhesive composition) in order to prevent water permeation to panel 3 (electronic paper) as described above.

A method of interposing an adhesive composition between base 10 and protective member 20 may be, but not particularly limited to, for example, a method involving previously applying the adhesive composition to a desired region on the lamination side of one or both of base 10 and protective member 20 and stacking base 10 and protective member 20. The adhesive composition can be applied by any of the methods known in the art, and examples thereof include screen printing and application using a dispenser.

After stacking base 10 and protective member 20, the adhesive composition is cured by irradiation with light. Ultraviolet light is preferred as the irradiation light, and examples of the light source thereof include a low pressure mercury lamp, a high pressure mercury lamp, an ultra-high pressure mercury lamp, and a halogen lamp. Generally, the amount of irradiation is preferably 1,000 to 3,000 mJ/cm$^2$.

The irradiation direction of ultraviolet light is not particularly limited, and the adhesive composition may be irradiated with ultraviolet light, for example, from the side of protective member 20 or from the end face side of the image display apparatus, that is, between frame 4 and shade part 22. Light irradiation may be carried out by combining these irradiation directions.

The curing of the adhesive composition may be accelerated by optionally heating the image display apparatus in combination with the ultraviolet light irradiation. The heating temperature is preferably 60 to 100° C. from the point of view of preventing deformation and the like of a resin member of the image display apparatus. The heating may be conducted by any of the methods known in the art; for example, it is possible to carry out heating from any direction using a heater or the like.

EXAMPLES

Hereinafter, the present invention will be specifically described based on Examples, but the present invention is not limited to these Examples. The measuring methods of various physical properties are shown below.

(1) Viscosity Measurement

The adhesive compositions obtained in Examples and Comparative Examples were measured for the viscosity value at 25° C. and 10 rpm with an R-type viscometer using a cone having a diameter of 28 mm and an angle of 3°.

(2) Adhesive Strength Measurement

The adhesive compositions obtained in Examples and Comparative Examples were applied to a PET film having a thickness of 200 μm using an applicator to a thickness of 100 μm. A PET film having a thickness of 200 μm to be paired with the PET film was laminated to the PET film, and the resulting laminate was irradiated with 3,000 mJ/cm$^2$ of 100 mW/cm$^2$ ultraviolet light having a wavelength of 365 nm using an ultraviolet irradiation apparatus manufactured by USHIO INC. The laminated film was cut into a strip of 25 mm to produce a test piece, which was pulled at a tension rate of 10 mm/min in a direction of 180° using a tensile tester (model 210; manufactured by INTESCO Co., Ltd.) to measure the peel strength.

(3) Adhesive Strength after Durability Test

The adhesive compositions obtained in Examples and Comparative Examples were applied to a PET film having a thickness of 200 μm using an applicator to a thickness of 100 μm in the same manner as in evaluation (2). A PET film having a thickness of 200 μm to be paired with the PET film was laminated to the PET film, and the resulting laminate was irradiated with 3,000 mJ/cm$^2$ of 100 mW/cm$^2$ ultraviolet light having a wavelength of 365 nm using an ultraviolet irradiation apparatus manufactured by USHIO INC. The laminated film was cut into a strip of 25 mm to produce a test piece, which was put into a high-temperature and high-humidity chamber (60° C., 80% RH). The strip was removed from the chamber after 500 hours and cooled to room temperature to produce a test piece, which was pulled at a stress rate of 10 mm/min in a direction of 180° using a tensile tester (model 210; manufactured by INTESCO Co., Ltd.) to measure the peel strength.

(4) Total Light Transmittance

The adhesive compositions obtained in Examples and Comparative Examples were each applied between two pieces of nonalkali glass (Eagle XG manufactured by Corning Inc.) having a thickness of 0.7 mm so that the thickness of the adhesive composition may be 100 and the adhesive composition was irradiated with 3,000 mJ/cm$^2$ of 100 mW/cm$^2$ ultraviolet light having a wavelength of 365 nm using an ultraviolet irradiation apparatus manufactured by USHIO INC. The optical transmittance (total light transmittance) in the visible light region of the resulting cured product was measured in accordance with ISO 13468.

(5) Refractive Index

The refractive index of the adhesive compositions obtained in Examples and Comparative Examples was measured in accordance with ISO 489 D line.

(6) Storage Modulus E' (25)

The adhesive compositions obtained in Examples and Comparative Examples were irradiated with 3,000 mJ/cm$^2$ of 100 mW/cm$^2$ ultraviolet light having a wavelength of 365 nm using an ultraviolet irradiation apparatus manufactured by USHIO INC. The resulting cured products were measured using a dynamic viscoelasticity apparatus (trade name "DMS6100" manufactured by SII Nanotechnology Inc.) at a measurement frequency of 10 Hz while increasing the temperature from 20° C. to 140° C. at a rate of 10° C./min to specify the storage modulus E' (25) at 25° C.

(7) Cure Shrinkage

The cure shrinkage was calculated based on the following equation according to JIS A 6024 from the liquid specific gravity (D1) of the adhesive composition before curing and the solid specific gravity (Ds) of the cured film of the adhesive composition.

$$\text{Cure shrinkage } S\ (\%) = (Ds - D1)/Ds \times 100$$

The liquid specific gravity (D1) of the adhesive composition before curing was measured by a specific gravity cup method according to JIS K 6833. On the other hand, the solid specific gravity (Ds) of the cured film of the adhesive composition was measured by a water replacement method according to JIS K 7112.

(8) Amount of Moisture Permeation

The amount of moisture permeation was measured by a moisture permeation cup method under a condition of 60° C. and 80% according to JIS Z 0208.

Synthesis of Polyisopropyltoluene (Polymer (1))

To a flask of 500 mL equipped with a thermometer and a stirrer were added 100 g of isopropenyl toluene and 200 g of toluene, and the temperature was brought to −15° C. with stirring. To the flask was dropwise added 0.25 g of a boron trifluoride-phenol complex over about 10 minutes while keeping the temperature at −15° C., followed by further stirring for 2 hours. Subsequently, 50 g of 2% aqueous sodium hydroxide was added to the flask, followed by further stirring for 30 minutes to decompose the catalyst. The polymerization liquid was washed with water to neutralize the pH, and then the solvent and unreacted monomer were distilled off under a condition of 200° C. and 5 mmHg to afford polymer (1).

The number-average molecular weight (Mn) in terms of styrene measured by GPC was 650, and the ratio of weight-average molecular weight to number-average molecular weight (Mw/Mn) was 1.7. The polymer (1) had a softening point of 80° C. and a Hazen color index (APHA) of 30. These values are shown in Table 1.

The softening point was measured by the ring and ball method using ASP-MG manufactured by MEITECH Company, Ltd. The Hazen color index was measured using a special-purpose machine for transmission color measurement: TZ 6000 (manufactured by Nippon Denshoku Industries Co., Ltd.).

A molded plate of the polymer (1) having a thickness of 1 mm was prepared. The molded plate was measured for the total light transmittance in the visible light region using a haze meter NDH4000 (manufactured by Nippon Denshoku Industries Co., Ltd.) according to JIS K7361-1. The total light transmittance was 91%.

Synthesis of a Copolymer (Polymer (2)) of Isopropenyl Toluene and Methyl-1-Butene To a flask of 500 mL equipped with a thermometer and a stirrer were added 90 g of isopropenyl toluene, 10 g of 2-methyl-1-butene, and 200 g of toluene, and the temperature was brought to −15° C. with stirring. To the flask was dropwise added 0.25 g of a boron trifluoride-phenol complex over about 10 minutes while keeping the temperature at −15° C., followed by further stirring for 2 hours. Subsequently, 50 g of 2% aqueous sodium hydroxide was added to the flask, followed by further stirring for 30 minutes to decompose the catalyst. The polymerization liquid was washed with water to neutralize the pH, and then the solvent and unreacted monomer were distilled off under a condition of 200° C. and 5 mmHg to afford polymer (2).

The number-average molecular weight (Mn) in terms of styrene measured by GPC was 600, and the ratio of weight-average molecular weight to number-average molecular weight (Mw/Mn) was 1.8. The polymer (2) had a softening point of 80° C. and a Hazen color index (APHA) of 30. Further, when a molded plate of the polymer (2) was prepared in the same manner as the polymer (1) and its total light transmittance in the visible light region was measured, the total light transmittance (1 mm in thickness) was 91%.

Synthesis of a Copolymer (Polymer (3)) of Isopropenyl Toluene and 1,3-Dipentadiene To a flask of 500 mL equipped with a thermometer and a stirrer were added 90 g of isopropenyl toluene, 10 g of 1,3-dipentadiene, and 200 g of toluene, and the temperature was brought to −15° C. with stirring. To the flask was dropwise added 0.25 g of a boron trifluoride-phenol complex over about 10 minutes while keeping the temperature at −15° C., followed by further stirring for 2 hours. Subsequently, 50 g of 2% aqueous sodium hydroxide was added to the flask, followed by further stirring for 30 minutes to decompose the catalyst. The polymerization liquid was washed with water to neutralize the pH, and then the solvent and unreacted monomer were distilled off under a condition of 200° C. and 5 mmHg to afford polymer (3).

The number-average molecular weight (Mn) in terms of styrene measured by GPC was 700, and the ratio of weight-average molecular weight to number-average molecular weight (Mw/Mn) was 1.7. The polymer (3) had a softening point of 80° C. and a Hazen color index (APHA) of 30.

Further, when the molded plate of the polymer (3) was prepared in the same manner as the polymer (1) and its total light transmittance in the visible light region was measured, the total light transmittance (1 mm in thickness) was 91%.

Synthesis of Acrylic Polymer (Polymer (4))

To a flask of 500 mL equipped with a thermometer, a stirrer and a condenser were added 100 g of toluene, 95 g of 2-ethylhexyl acrylate, 5 g of acrylic acid, and 4 g of n-dodecyl mercaptan, and the mixture was sealed with nitrogen and heated to a temperature of 140° C. with stirring. After verifying that the temperature has become constant, a mixed solution of 1 g of t-butylperoxy-2-ethylhexanoate and 100 g of toluene was fed over 120 minutes. After completion of feeding, the mixture was held at 140° C. for 3 hours. Thereafter, the solvent and the unreacted monomer were distilled off under a condition of 160° C. and 5 mmHg to afford polymer (4).

The number-average molecular weight (Mn) in terms of styrene measured by GPC was 3,500, and the ratio of weight-average molecular weight to number-average molecular weight (Mw/Mn) was 3.2.

Synthesis of Acrylic Polymer (Polymer (5))

To a flask of 500 mL equipped with a thermometer, a stirrer and a condenser were added 100 g of toluene, 85 g of 2-ethylhexyl acrylate, 10 g of styrene, 5 g of acrylic acid, and 4 g of n-dodecyl mercaptan, and the mixture was sealed with nitrogen and heated to a temperature of 140° C. with stirring. After verifying that the temperature has become constant, a mixed solution of 1 g of t-butylperoxy-2-ethylhexanoate and 100 g of toluene was fed over 120 minutes. After completion of feeding, the mixture was held at 140° C. for 3 hours. The solvent and the unreacted monomer were distilled off under a condition of 160° C. and 5 mmHg to afford polymer (5).

The number-average molecular weight (Mn) in terms of styrene measured by GPC was 4,000, and the ratio of weight-average molecular weight to number-average molecular weight (Mw/Mn) was 2.8.

The following commercially available products were used as polymers (6) to (8).

Polymer (6): terpene phenol tackifier, TAMANOL 803L, Arakawa Chemical Industries, Ltd. (softening point: 155° C., Hazen color index (APHA): 450, total light transmittance in the visible light region (1 mm in thickness): 60%)

Polymer (7): aliphatic hydrocarbon resin, ARKON M90, Arakawa Chemical Industries, Ltd. (softening point: 90° C., Hazen color index (APHA): 40, total light transmittance in the visible light region (1 mm in thickness): 91%)

Polymer (8): terpene hydride, Clearon M105, Yasuhara Chemical Co., Ltd. (softening point: 105° C., Hazen color index (APHA): 10, total light transmittance in the visible light region (1 mm in thickness): 92%)

TABLE 1

| | | Mn | Mw/Mn | Softening point (° C.) | APHA | Total light transmittance in the visible light region (%) |
|---|---|---|---|---|---|---|
| Polymer (1) | Polyisopropyltoluene | 650 | 1.7 | 80 | 30 | 91 |
| Polymer (2) | Isopropenyl toluene/ methyl-1-butene copolymer | 600 | 1.8 | 80 | 30 | 91 |
| Polymer (3) | Isopropenyl toluene/ 1,3-dipentadiene copolymer | 700 | 1.7 | 80 | 30 | 91 |
| Polymer (4) | Acrylic polymer | 3500 | 3.2 | — | — | — |
| Polymer (5) | Acrylic polymer | 4000 | 2.8 | — | — | — |
| Polymer (6) | Terpene phenol polymer | — | — | 155 | 450 | 60 |

TABLE 1-continued

|  |  | Mn | Mw/Mn | Softening point (° C.) | APHA | Total light transmittance in the visible light region (%) |
|---|---|---|---|---|---|---|
| Polymer (7) | Saturated alicyclic hydrocarbon resin | — | — | 90 | 40 | 91 |
| Polymer (8) | Terpene hydride | — | — | 105 | 10 | 92 |

In addition, other components used in each Example and Comparative Example are shown below.

(Meth)acrylic Monomers

Monofunctional acrylic monomer (1): laurylacrylate, Shin-Nakamura Chemical Co., Ltd.

Monofunctional acrylic monomer (2): 2-ethylhexyl acrylate

Bifunctional acrylic monomer (1): nonyl diacrylate, Shin-Nakamura Chemical Co., Ltd.

Bifunctional acrylic monomer (2): polybutadiene-terminated acrylate BAC-45, OSAKA ORGANIC CHEMICAL INDUSTRY LTD Photoinitiator Photoinitiator (1): 1-hydroxy-cyclohexyl-phenyl-ketone (IRGACURE 184, manufactured by BASF A.G.)

Photoinitiator (2): 2,4,6-trimethylbenzoyl-diphenyl-phosphine oxide (Lucirin TPO, manufactured by BASF A.G.)

Other Components

Chain transfer agent: n-dodecyl mercaptan

Example 1

There were mixed 100 parts by weight of the polymer (1) (polyisopropyltoluene), 55 parts by weight of laurylacrylate, 5 parts by weight of nonyl diacrylate, 5 parts by weight of 1-hydroxy-cyclohexyl-phenyl-ketone, 2 parts by weight of 2,4,6-trimethylbenzoyl-diphenyl-phosphine oxide, and 2 parts by weight of n-dodecyl mercaptan to afford an adhesive composition.

This adhesive composition was measured for (1) viscosity, (2) adhesive strength, (3) adhesive strength after durability test, (4) total light transmittance in the visible light region of a cured product, (5) refractive index, (6) storage modulus E' (25), (7) cure shrinkage, and (8) amount of moisture permeation, according to the methods described above, respectively. The results are shown in Table 2.

Examples 2 to 15 and Comparative Examples 1 to 7

Adhesive compositions were obtained in the same manner as in Example 1 except that each component was mixed according to the blending ratios shown in Table 2 and Table 3. These adhesive compositions were measured for (1) viscosity, (2) adhesive strength, (3) adhesive strength after durability test, (4) total light transmittance in the visible light region of a cured product, (5) refractive index, (6) storage modulus E' (25), (7) cure shrinkage, and (8) amount of moisture permeation, respectively. The results are shown in Tables 2 and 3.

TABLE 2

|  |  | Mn | Mw/Mn | Example 1 | Example 2 | Example 3 | Example 4 | Example 5 | Example 6 | Comparative Example 1 |
|---|---|---|---|---|---|---|---|---|---|---|
| Component | Polymer (1) | 650 | 1.7 | 100 | 100 | 100 | 100 | 80 | 80 | 100 |
|  | Polymer (2) | 600 | 1.8 |  |  |  |  | 20 |  |  |
|  | Polymer (3) | 700 | 1.7 |  |  |  |  |  | 20 |  |
|  | Polymer (4) | 3500 | 3.2 |  |  |  |  |  |  |  |
|  | Polymer (5) | 4000 | 2.8 |  |  |  |  |  |  |  |
|  | Polymer (6) |  |  |  |  |  |  |  |  |  |
|  | Polymer (7) |  |  |  |  |  |  |  |  |  |
|  | Polymer (8) |  |  |  |  |  |  |  |  |  |
|  | 1 Monofunctional acrylic monomer (1) |  |  | 55 | 55 | 30 | 80 | 55 | 55 | 20 |
|  | 1 Monofunctional acrylic monomer (2) |  |  |  |  |  |  |  |  |  |
|  | 2 Bifunctional acrylic monomer (1) |  |  | 5 | 5 | 2 | 7 | 5 | 5 | 5 |
|  | 2 Bifunctional acrylic monomer (2) |  |  |  |  |  |  |  |  |  |
|  | Photoinitiator (1) |  |  | 5 | 5 | 5 | 5 | 5 | 5 | 5 |
|  | Photoinitiator (2) |  |  | 2 |  | 2 | 2 | 2 | 2 | 2 |
|  | Chain transfer agent |  |  | 2 | 2 | 2 | 2 | 2 | 2 | 2 |
| Evaluation | (1) Viscosity (Pa · s) |  |  | 2.0 | 2.0 | 3.5 | 1.5 | 2.0 | 2.0 | 4.0 |
|  | (2) Adhesive strength (N/25 mm) |  |  | 4.0 | 4.5 | 3.5 | 3.0 | 4.0 | 4.0 | 3.2 |
|  | (3) Adhesive strength after durability test (N/25 mm) |  |  | 3.0 | 2.0 | 1.5 | 2.5 | 3.0 | 3.0 | 0.8 |
|  | (4) Total light transmittance (%) |  |  | 98 | 98 | 98 | 98 | 98 | 98 | 98 |
|  | (5) Refractive index |  |  | 1.53 | 1.53 | 1.54 | 1.50 | 1.51 | 1.51 | 1.54 |
|  | (6) Storage modulus E' (25) (MPa) |  |  | 29 | 58 | 74 | 23 | 27 | 23 | 84 |
|  | (7) Cure shrinkage (%) |  |  | 3.1 | 3.5 | 2.1 | 3.2 | 3.3 | 3.2 | 1.8 |
|  | (8) Amount of moisture permeation (g/m² · 100 μm · day) |  |  | 207 | 163 | 142 | 222 | 215 | 212 | 121 |

|  |  | Mn | Mw/Mn | Comparative Example 2 | Comparative Example 3 | Comparative Example 4 | Comparative Example 5 | Comparative Example 6 | Comparative Example 7 |
|---|---|---|---|---|---|---|---|---|---|
| Component | Polymer (1) | 650 | 1.7 |  |  |  |  |  |  |
|  | Polymer (2) | 600 | 1.8 |  |  |  |  |  |  |

TABLE 2-continued

|  |  |  |  |  |  |  |  |  |
|---|---|---|---|---|---|---|---|---|
|  | Polymer (3) | 700 | 1.7 |  |  |  |  |  |
|  | Polymer (4) | 3500 | 3.2 | 100 |  | 100 |  |  |
|  | Polymer (5) | 4000 | 2.8 |  | 100 |  |  |  |
|  | Polymer (6) |  |  |  |  |  | 100 | 100 |
|  | Polymer (7) |  |  |  |  |  |  |  |
|  | Polymer (8) |  |  |  |  |  |  |  |
|  | 1 Monofunctional acrylic monomer (1) |  |  | 5 | 5 | 55 | 50 | 5 |  |
|  | 1 Monofunctional acrylic monomer (2) |  |  | 150 | 150 |  | 20 | 150 | 55 |
|  | 2 Bifunctional acrylic monomer (1) |  |  |  |  | 5 |  | 5 | 5 |
|  | 2 Bifunctional acrylic monomer (2) |  |  |  |  |  | 100 |  |  |
|  | Photoinitiator (1) |  |  | 5 | 5 | 5 | 5 | 5 | 5 |
|  | Photoinitiator (2) |  |  | 2 | 2 | 2 | 2 | 2 | 2 |
|  | Chain transfer agent |  |  | 2 | 2 | 2 | 2 | 2 | 2 |
| Evaluation | (1) Viscosity (Pa · s) |  |  | 3.0 | 3.5 | 45 | 2.5 | 5.0 | 80 |
|  | (2) Adhesive strength (N/25 mm) |  |  | 0.8 | 1.0 | 0.5 | 1.5 | 2.2 | 3.5 |
|  | (3) Adhesive strength after durability test (N/25 mm) |  |  | 0 | 0 | 0 | 0.8 | 0.8 | 1.8 |
|  | (4) Total light transmittance (%) |  |  | 95 | 92 | 95 | 95 | 84 | 78 |
|  | (5) Refractive index |  |  | 1.45 | 1.51 | 1.45 | 1.50 | 1.47 | 1.53 |
|  | (6) Storage modulus E' (25) (MPa) |  |  | 6.0 | 8.3 | 15 | 4.4 | 6.6 | 15 |
|  | (7) Cure shrinkage (%) |  |  | 4.7 | 4.6 | 3.0 | 3.8 | 4.5 | 3.4 |
|  | (8) Amount of moisture permeation (g/m² · 100 μm · day) |  |  | 933 | 831 | 740 | 1205 | 910 | 671 |

TABLE 3

|  |  | Mn | Mw/Mn | Example 7 | Example 8 | Example 9 | Example 10 | Example 11 |
|---|---|---|---|---|---|---|---|---|
| Component | Polymer (1) | 650 | 1.7 | 100 | 100 | 100 |  |  |
|  | Polymer (2) | 600 | 1.8 |  |  |  |  |  |
|  | Polymer (3) | 700 | 1.7 |  |  |  |  |  |
|  | Polymer (4) | 3500 | 3.2 |  |  |  |  |  |
|  | Polymer (5) | 4000 | 2.8 |  |  |  |  |  |
|  | Polymer (6) |  |  |  |  |  |  |  |
|  | Polymer (7) |  |  |  |  |  | 100 | 100 |
|  | Polymer (8) |  |  |  |  |  |  |  |
|  | 1 Monofunctional acrylic monomer (1) |  |  | 90 | 150 | 180 | 30 | 100 |
|  | 1 Monofunctional acrylic monomer (2) |  |  |  |  |  |  |  |
|  | 2 Bifunctional acrylic monomer (1) |  |  | 5 | 5 | 5 | 2 | 5 |
|  | 2 Bifunctional acrylic monomer (2) |  |  |  |  |  |  |  |
|  | Photoinitiator (1) |  |  | 5 | 5 | 5 | 5 | 5 |
|  | Photoinitiator (2) |  |  | 2 | 2 | 2 | 2 | 2 |
|  | Chain transfer agent |  |  | 2 |  |  |  |  |
| Evaluation | (1) Viscosity (Pa · s) |  |  | 1.3 | 0.8 | 0.4 | 3.4 | 1.2 |
|  | (2) Adhesive strength (N/25 mm) |  |  | 2.2 | 2.0 | 1.8 | 3.3 | 2.0 |
|  | (3) Adhesive strength after durability test (N/25 mm) |  |  | 1.8 | 1.6 | 1.4 | 1.2 | 1.6 |
|  | (4) Total light transmittance (%) |  |  | 98 | 98 | 98 | 98 | 98 |
|  | (5) Refractive index |  |  | 1.50 | 1.49 | 1.48 | 1.52 | 1.49 |
|  | (6) Storage modulus E' (25) (MPa) |  |  | 25 | 17 | 14 | 63 | 46 |
|  | (7) Cure shrinkage (%) |  |  | 3.7 | 3.3 | 3.5 | 1.8 | 2.8 |
|  | (8) Amount of moisture permeation (g/m² · 100 μm · day) |  |  | 230 | 247 | 254 | 155 | 191 |

|  |  | Mn | Mw/Mn | Example 12 | Example 13 | Example 14 | Example 15 |
|---|---|---|---|---|---|---|---|
| Component | Polymer (1) | 650 | 1.7 |  |  |  |  |
|  | Polymer (2) | 600 | 1.8 |  |  |  |  |
|  | Polymer (3) | 700 | 1.7 |  |  |  |  |
|  | Polymer (4) | 3500 | 3.2 |  |  |  |  |
|  | Polymer (5) | 4000 | 2.8 |  |  |  |  |
|  | Polymer (6) |  |  |  |  |  |  |
|  | Polymer (7) |  |  | 100 |  |  |  |
|  | Polymer (8) |  |  |  | 100 | 100 | 100 |
|  | 1 Monofunctional acrylic monomer (1) |  |  | 180 | 30 | 100 | 180 |
|  | 1 Monofunctional acrylic monomer (2) |  |  |  |  |  |  |
|  | 2 Bifunctional acrylic monomer (1) |  |  | 5 | 2 | 5 | 5 |
|  | 2 Bifunctional acrylic monomer (2) |  |  |  |  |  |  |
|  | Photoinitiator (1) |  |  | 5 | 5 | 5 | 5 |
|  | Photoinitiator (2) |  |  | 2 | 2 | 2 | 2 |
|  | Chain transfer agent |  |  |  |  |  |  |
| Evaluation | (1) Viscosity (Pa · s) |  |  | 0.4 | 4.2 | 2.3 | 0.9 |
|  | (2) Adhesive strength (N/25 mm) |  |  | 1.7 | 3.2 | 2.2 | 1.6 |
|  | (3) Adhesive strength after durability test (N/25 mm) |  |  | 1.3 | 1.1 | 1.5 | 1.2 |
|  | (4) Total light transmittance (%) |  |  | 98 | 98 | 98 | 98 |
|  | (5) Refractive index |  |  | 1.47 | 1.52 | 1.49 | 1.47 |

TABLE 3-continued

| | | | | |
|---|---|---|---|---|
| (6) Storage modulus E' (25) (MPa) | 18 | 75 | 54 | 31 |
| (7) Cure shrinkage (%) | 3.2 | 1.9 | 2.9 | 3.3 |
| (8) Amount of moisture permeation ($g/m^2 \cdot 100 \, \mu m \cdot day$) | 253 | 137 | 162 | 194 |

In Examples 1 to 15 in which the amount of (meth)acrylic monomers is 30 to 190 parts by weight relative to 100 parts by weight of a hydrocarbon polymer, satisfactory results were obtained in all of the adhesive strength, adhesive strength after durability test, total light transmittance in the visible light region of a cured product, and refractive index. In Examples 1 to 15, the storage modulus E' (25) of the cured product exceeded $1.0 \times 10^7$ Pa, and the amount of moisture permeation was low.

On the other hand, in Comparative Example 1 in which the amount of (meth)acrylic monomers is less than 30 parts by weight relative to 100 parts by weight of hydrocarbon polymer (polyisopropyltoluene), the adhesive strength after durability test was significantly low as compared with Examples 1 to 6. This is inferred because the curing of the adhesive compositions was insufficient.

In Comparative Examples 2 to 4 in which an acrylic polymer was added instead of a hydrocarbon polymer and Comparative Example 5 in which a polymer was not blended, the adhesive strength and the adhesive strength after durability test were low, and the total light transmittance in the visible light region of the cured product was also lower than those in Examples 1 to 15. In Comparative Examples 2 to 5, the storage modulus E' (25) of a cured product was not more than $1.0 \times 10^7$ Pa, and the amount of moisture permeation was very large.

Furthermore, in Comparative Examples 6 and 7 in which a terpene phenol polymer having a low total light transmittance in the visible light region was added instead of polyisopropyltoluene, the total light transmittance of the cured product was very low as compared with those in Examples 1 to 15, and the amount of moisture permeation was also very large.

INDUSTRIAL APPLICABILITY

The adhesive composition of the present invention gives a cured product having high transparency and a high refractive index, has high adhesive strength, and shows less reduction in adhesive strength even when exposed to high temperatures. Therefore, it is suitable as a material for fixing a member of electronic and optical apparatuses, a filler on the side of the light extraction surface of an image display apparatus, and the like.

REFERENCE SIGNS LIST

1 Substrate
2 Backlight
3 Liquid Crystal Display Panel (Image Display Part)
4 Frame
5 Spacer
10 Base
20 Protective Member
21 Transparent Member
22 Shade Part
30 Filler

The invention claimed is:
1. An adhesive composition comprising:
(1) a hydrocarbon polymer having a total light transmittance in a visible light region at a thickness of 1 mm as measured according to JIS K7361-1 of 80% or more;
(2) at least one (meth)acrylic monomer selected from the group consisting of a monofunctional (meth)acrylic monomer having one (meth)acrylic group in a molecule and a bifunctional (meth)acrylic monomer having two (meth)acrylic groups in a molecule;
(3) a photoinitiator; and
(4) a copolymer of a $C_{4-6}$ unsaturated aliphatic hydrocarbon having one or two carbon-carbon double bonds in a molecule and isopropenyl toluene, the copolymer having a number-average molecular weight (Mn) of 400 to 1,200 and a molecular weight distribution (Mw/Mn) represented by a ratio of weight-average molecular weight (Mw) to number-average molecular weight (Mn) of 2 or less,
wherein the content of the component (2) is 30 parts by weight or more and less than 190 parts by weight relative to 100 parts by weight of the component (1).

2. The adhesive composition according to claim 1, wherein, in an image display apparatus comprising a protective member and a base having an image display part, the adhesive composition is arranged between the protective member and the base.

3. The adhesive composition according to claim 1, wherein the component (1) has a softening point of 70 to 130° C.

4. The adhesive composition according to claim 1, wherein a storage modulus E' (25) of a cured product of the adhesive composition as measured at 25° C. and 10 Hz is more than $1.0 \times 10^7$ Pa and $1.0 \times 10^9$ Pa or less.

5. The adhesive composition according to claim 1, wherein the component (1) is one or more polymers selected from the group consisting of polyisopropyltoluene, an alicyclic saturated hydrocarbon resin, and a terpene hydride.

6. The adhesive composition according to claim 5, wherein the component (1) is polyisopropyltoluene having a number-average molecular weight (Mn) of 400 to 1,200 and a molecular weight distribution (Mw/Mn) represented by a ratio of weight-average molecular weight (Mw) to number-average molecular weight (Mn) of 2 or less.

7. The adhesive composition according to claim 6, wherein the component (1) is polyisopropyltoluene prepared by polymerizing isopropenyl toluene with a Friedel-Crafts catalyst.

8. The adhesive composition according to claim 1, wherein the monofunctional (meth)acrylic monomer is represented by the following general formula (1):

(1)

wherein $R_1$ represents a $C_{4-18}$ hydrocarbon group, and $R_2$ represents a hydrogen atom or a methyl group.

9. The adhesive composition according to claim 1, wherein the bifunctional (meth)acrylic monomer is represented by the following general formula (2):

(2)

wherein $R_3$ represents a $C_{4-12}$ hydrocarbon group, and $R_4$ and $R_5$ independently represent a hydrogen atom or a methyl group.

10. The adhesive composition according to claim 1, wherein the adhesive composition has a viscosity at 25° C. and 10 rpm as measured by an R-type viscometer of 0.5 to 10 Pa·s.

11. An image display apparatus comprising:
a protective member;
a base having an image display part; and
a filler interposed between the protective member and the base,
wherein the filler is a cured product of the adhesive composition according to claim 1.

12. A method for producing an image display apparatus comprising a protective member, a base having an image display part, and a filler interposed between the protective member and the base, the method comprising:
interposing the adhesive composition according to claim 1 between the protective member and the base; and
curing the adhesive composition by light irradiation.

* * * * *